United States Patent [19] [11] 4,158,729
Kimura et al. [45] Jun. 19, 1979

[54] PROCESS FOR PRODUCING POLYOXYMETHYLENE

[75] Inventors: Harutaka Kimura, Tokyo; Seiichi Nozawa, Yamato; Seiichi Mukai; Masaharu Shikama, both of Kawasaki, all of Japan

[73] Assignee: Mitsubishi Chemical Industries Ltd., Tokyo, Japan

[21] Appl. No.: 891,838

[22] Filed: Mar. 30, 1978

[30] Foreign Application Priority Data

Apr. 14, 1977 [JP] Japan .................................. 52-42836
Apr. 22, 1977 [JP] Japan .................................. 52-46508
Oct. 17, 1977 [JP] Japan .................................. 52-124187

[51] Int. Cl.² ............................................. C08G 2/08
[52] U.S. Cl. .................................. 528/238; 528/242; 528/243
[58] Field of Search .................. 260/67 FP, 67 R; 528/238, 242, 243

[56] References Cited

U.S. PATENT DOCUMENTS 3,252,937  5/1966  Natta et al. .................. 260/67 R
3,305,530  2/1967  Warren ........................ 260/67 FP

FOREIGN PATENT DOCUMENTS 41-4350  3/1966  Japan .......................... 260/67 FP Primary Examiner—Lucille M. Phynes
Attorney, Agent, or Firm—Oblon, Fisher, Spivak, McClelland & Maier

[57] ABSTRACT

Polyoxymethylene is produced by polymerizing formaldehyde in the presence of a catalyst comprising a catalytic component of an organoaluminum compound or a complex thereof supported on a modifier of a higher carboxylic acid amide compound.

The organoaluminum compound can be in a form of a complex of the organoaluminum compound and a phosphorus compound or an amine.

12 Claims, No Drawings

PROCESS FOR PRODUCING POLYOXYMETHYLENE

BACKGROUND OF THE INVENTION

1. Field of the Invention

The present invention relates to a process for producing a polyoxymethylene. More particularly, it relates to a process for producing a polyoxymethylene having high polymerization degree and high thermal stability by an advantageous industrial process.

Description of the Prior Arts

Polyoxymethylene have excellent mechanical characteristics and have been used for various usages as the engineering plastics. However, a polyoxymethylene produced by polymerizing formaldehyde in the presence of the known catalysts has inferior thermal stability and it could not be used without a modification. Accordingly, the thermal stability of polyoxymethylene has been improved by an esterification or etherification of terminal hydroxyl groups of the polymer. The method of improving thermal stability by modifying the terminal groups requires the post-treatment after the polymerization and accordingly, it is not economical process.

Moreover, the thermal stability in the post-treatment for modifying the terminal groups should be considered and accordingly the thermal stability of the polymer used for the post-treatment should be high.

It has been known to produce a polyoxymethylene by using a catalyst of a reaction product or a coordination complex compound of an organometallic compound having a metal element of the I to III group of the periodic table with a nitrogen-containing compound in Japanese Patent Publication No. 4350/1966. The nitrogen-containing compounds are aliphatic or aromatic acid amides and only acetamide and acetanilide are exemplified.

However, polyoxymethylene having satisfactory thermal stability could not be obtained by using the catalyst of a combination of an organometallic compound and acetamide or acetanilide as a modifier as shown in the results of Preparations No. 18 and 21 in the Examples.

SUMMARY OF THE INVENTION

It is an object of the present invention to provide a process for producing a polyoxymethylene having high thermal stability by an economical industrial method.

It is another object of the present invention to provide a process for producing a polyoxymethylene having high thermal stability without a post-treatment for modifying terminal groups.

The foregoing and other objects of the present invention have been attained by providing a process for producing a polyoxymethylene having an improved thermal stability by polymerizing formaldehyde in the presence of a catalyst component of the specific organoaluminum compound supported on the specific carrier as a modifier.

The present invention is to provide a process for producing a polyoxymethylene by polymerizing formaldehyde in the presence of a catalyst comprising a catalytic component of an organoaluminum compound and a modifier of a higher carboxylic acid amide compound.

DETAILED DESCRIPTION OF PREFERRED EMBODIMENTS

The formaldehyde used as the starting material in the process of the present invention can be gaseous form or liquid form and substantially anhydrous formaldehyde having less than 1.0 wt. % of water content especially less than 0.1 wt. % of water content. The substantially anhydrous formaldehyde can be obtained by thermally decomposing paraformaldehyde in a high boiling point medium such as liquid paraffin and phthalic anhydride and passing the resulting formaldehyde gas through a column filled with a dehydration absorbent such as an ion-exchange resin.

It is possible to add a small amount of a comonomer such as ethyleneoxide with formaldehyde as the starting material for the copolymerization.

In the process of the present invention, the catalytic component can be (1) an organoaluminum compound; or (2) a complex compound of the organoaluminum compound with an amine; or (3) a complex compound of the organoaluminum compound with a phosphorus compound and the modifier as the carrier can be the higher carboxylic acid amide compound (at least $C_{12}$).

In order to produce polyoxymethylene having high polymerization degree, it is preferable to select the complex compound of the catalytic component (2) or (3) as the catalytic component.

In the present invention, organoaluminum compounds have the following formula (I):

wherein $R^1$ represents an alkyl or alkoxyl group; $R^2$ represents an alkyl or alkoxyl group or a halogen atom; $R^3$ represents an alkyl or alkoxyl group or a halogen atom or

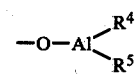

and $R^4$ and $R^5$ respectively represent in alkyl or alkoxyl group or a halogen atom.

Various organoaluminum compounds can be used as the organoaluminum compound having the formula (I) which is used as the catalytic component (1) or the raw material for the complex compounds of the catalytic components (2) and (3).

The typical aluminum compounds used are as follows:

wherein $R^6$ and $R^7$ respectively represent an alkyl group especially a lower alkyl ($C_1$–$C_5$) and l represents an integer of 1 to 3;

wherein $R^8$ represents an alkyl group especially a lower alkyl ($C_1$–$C_5$) and X represents a halogen atom and m represents an integer of 1 to 2;

wherein $R^9$ represents an alkyl group especially a lower alkyl group ($C_1$-$C_5$) and $X^2$ represents a halogen atom and n represents an integer of 1 to 3;

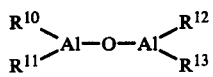   (V)

wherein $R^{10}$, $R^{11}$, $R^{12}$ and $R^{13}$ respectively represent an alkyl group especially a lower alkyl group ($C_1$-$C_5$) or an alkoxyl group especially a lower alkoxyl group ($C_1$-$C_5$) or a halogen atom, and at least one of $R^{10}$, $R^{11}$, $R^{12}$ and $R^{13}$ represents an alkyl group or an alkoxyl group.

The organoaluminum compounds having the formula (II) include monoethoxyaluminum diethyl, monoethoxyaluminum diisobutyl, monoethoxyaluminum diisopropyl, monoisobutoxyaluminum diisobutyl, diethoxyaluminum monoisobutyl, diisobutoxyaluminum monoisobutyl, di-n-propoxyaluminum mono-n-propyl, mono-n-propoxyaluminum di-n-propyl, triethoxyaluminum etc. It is optimum to use monoethoxyaluminum diethyl.

The organoaluminum compounds having the formula (III) include ethoxyaluminum dichloride, ethoxyaluminum dibromide, ethoxyaluminum diiodide, isobutoxyaluminum dichloride, diethoxyaluminum chloride, diethoxyaluminum bromide, diethoxyaluminum iodide, diisobutoxyaluminum chloride, di-n-propoxyaluminum chloride, n-propoxyaluminum dichloride, etc. It is optimum to use ethoxyaluminum dichloride. These compounds can be produced by oxidizing the corresponding organoaluminum compound. For example, ethoxyaluminum dichloride is produced by oxidizing ethylaluminum dichloride with air in a solvent such as hexane.

The organoaluminum compounds having the formula (IV) include trialkyl aluminums such as triethyl aluminum, triisobutyl aluminum, tri-n-propyaluminum, tri-n-butylaluminum, tri-n-hexylaluminum, tri-n-octylaluminum and tri-n-decylaluminum; and di- or mono-alkylaluminum halides such as diethylaluminum chloride, diethylaluminum bromide, diethylaluminum iodide, ethylaluminum dichloride, ethylaluminum dibromide, ethylaluminum diiodide, ethylaluminum sesquichloride, diisobutylaluminum chloride, isobutylaluminum dichloride, di-n-propylaluminum chloride, n-propylaluminum dichloride, etc.

The aluminum compounds having the formula (V) include

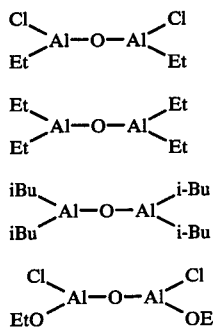

wherein Et represents ethyl group and i.Bu represents isobutyl group. The compounds (b) are preferably used.

These compounds can be produced by reacting the corresponding organoaluminum compound with water. For example, the compound (a) is produced by reacting diethylaluminum monochloride with water in a solvent such as hexane, and the compound (b) is produced by using triethylaluminum and the compound (d) is produced by using diethoxyaluminum monochloride obtained by oxidizing diethylaluminum monochloride with air in a solvent such as hexane.

Polyoxymethylene having high polymerization degree and high thermal stability can be obtained by using the catalyst comprising the organoaluminum compound supported on the modifier of the higher carboxylic acid amide compound.

In order to produce polyoxymethylene having further higher polymerization degree, it is preferable to use the organoaluminum compound having no halogen atom i.e. the organoaluminum compound having the formula (I) wherein $R^1$ represents an alkyl or alkoxyl group; $R^2$ represents an alkyl or alkoxyl group; $R^3$ represents an alkyl or alkoxyl group or

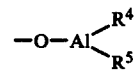

and $R^4$ and $R^5$ respectively represent an alkyl or alkoxyl group; or the complex compound of the organoaluminum compound with the phosphorus compound or the amine.

The amines used for preparing the complex compound as the catalytic component can be the known amines which form complexes with an organoaluminum compound.

Suitable amines include 1,8-diazabicyclo(5,4,0)undecene-7, bipyridine, pyridine, ethylenediamine, propylenediamine, tri-n-butylamine, stearly amine, etc.

The phosphorus compounds used for preparing the complex compound as the catalytic component can be the known phosphorus compounds which form complexes with an organoaluminum compound.

The typical phosphorus compounds are as follows:

   (VI)

wherein $R^{14}$ represents an alkyl, aryl, alkoxyl or aryloxyl group; and

   (VII)

wherein $R^{15}$ represents an alkyl, aryl, alkoxyl, or aryloxyl group or

and $R^{16}$ and $R^{17}$ respectively an alkyl group. The phosphorus compounds having the formula (VI) or (VII) usually have a hydrocarbon moiety having 1 to 20 of carbon atoms.

Suitable phosphorus compounds having the formula (VI) include phosphines such as triphenylphosphine, tri-n-butylphosphine and triethylphosphine; and phosphites such as tripenylphosphite, tri-n-butylphosphite and trisnonylphenylphosphite.

Suitable phosphorus compounds having the formula (VII) include phosphates such as trimethylphosphate and triphenylphosphate and phosphineoxides such as tri-n-butylphosphineoxide and triphenylphosphineoxide and hexamethylphosphoric triamides.

It is optimum to use hexamethylphosphoric triamide, triphenylphosphine, triphenylphosphite, triphenylphosphate, tri-n-butylphosphite and tri-n-butylphosphate from the viewpoint of easy availability and effects.

The complex compound of the catalytic component (2), (3) can be easily prepared by the conventional process. For example, the phosphorus compound or the amine is mixed with the organoaluminum compound at a molar ratio of 0.1 to 20 preferably 0.5 to 10 especially 0.5 to 2 of the phosphorus compound or the amine to the organoaluminum compound in a hydrocarbon such as n-hexane, n-heptane, benzene and toluene at room temperature. The complex compound can be supported on the modifier of the carrier after separating it from the raw material or the complex compound can be also supported as the mixture of the raw materials.

The amount of the complex compound as the catalytic component can be selected as desired and is usually in a range of $10^{-1}$ to $10^{-6}$ preferably $10^{-3}$ to $10^{-5}$ mole of the organoaluminum compound per liter to the liquid medium in the case of liquid phase polymerization and to the volume of the reactor in the case of the gas phase polymerization.

The higher carboxylic acid amide compound having the following formula (VIII) or (IX) is preferably used as the modifier supporting the catalytic component.

$$R^{18}-CONH_2 \qquad (VIII)$$

or $$R^{19}-CONH-R^{20}-NHCO-R^{21} \qquad (IX)$$

wherein $R^{18}$ represents a $C_{11}-C_{30}$ alkyl group; $R^{19}$ and $R^{21}$ respectively represent a $C_{11}-C_{30}$ alkyl group; and $R^{20}$ represents a $C_1-C_{10}$ alkylene group, a $C_6-C_{20}$ aromatic divalent group or a $C_3-C_{20}$ alicyclic divalent group. Preferably, $R^{20}$ represents $C_1-C_{10}$ alkylene group.

Suitable $C_6-C_{20}$ aromatic divalent groups include phenylene, naphthylene group or

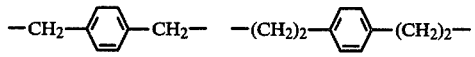

Suitable $C_3-C_{20}$ alicyclic divalent group include cyclohexylene, cyclopentylene, cyclobutylene, cyclopropylene group,

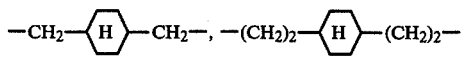

Suitable amide compounds having the formula (VIII) include lauramide, stearamide, oleamide and palmitamide.

Suitable amide compounds having the formula (IX) include methylenebissteroramide, ethylenebisstearamide, butylenebisstearamide, ethylenebislauramide, phenylenebisstearamide and 1,4-cyclohexylenebisstearamide.

The amide compounds as the modifier are used as the carrier for supporting the catalytic component whereby the amide compounds should be in a solid form in the polymerization system. Accordingly, it is necessary to select the amide compound which is not molten at the polymerization temperature.

In the polymerization using a medium, it is necessary to select the amide compound which is insoluble in the medium.

The amide compounds having the formula (VIII) or (IX) satisfy the requirement.

It is optimum from the viewpoint of thermal stability of the resulting polyoxymethylene to use stearamide or the amide compound having the formula (IX) wherein $R^{19}$ and $R^{21}$ are respectively a $C_{11}-C_{17}$ alkyl group and $R^{20}$ is a $C_1-C_4$ alkylene group.

The known methods can be employed for supporting the catalytic component on the modifier. For example, it is possible to employ a method of mixing the catalytic component and the modifier; a method of dissolving or suspending the catalytic component in suitable medium and then, mixing it with the modifier, a method of mixing them at higher than 50° C.

In an industrial process, it is suitable to employ the method of mixing the catalytic component in the medium with the modifier. In the process, it is preferable to remove free catalytic component which is not supported on the modifier by a distillation or a washing from the catalytic supported on the modifier.

The resulting catalytic component supported on the modifier can be further heat-treated, for example, at more than 50° C.

The ratio of the catalytic component to the modifier is usually in a range of $10^{-1}-10^{-6}$ mole/g-modifier especially $10^{-2}-10^{-5}$ mole/g-modifier.

In the resulting catalytic component supported on the modifier, the catalytic component is considered to be chemically bonded on the modifier and is not simply adhered on the modifier. Even though the catalytic component supported on the modifier is dipped in an organic medium, the catalytic component is not dissolved and even though it is heated at the temperature higher than the boiling point of the catalytic component, the catalytic component is not distilled off.

In the process of the present invention, the preparation of a polyoxymethylene is carried out by contacting formaldehyde with the catalytic component supported on the modifier.

Various polymerization processes have been known and suitable processes can be employed. For example, it is possible to employ a slurry polymerization process wherein formaldehyde is dissolved in an inert solvent and the catalyst is added to the solution or gaseous formaldehyde is continuously fed into an inert solvent dispersing the catalyst; or a gas phase polymerization process wherein the catalyst dispersed in a medium is fed into a reactor and the medium is distilled off and gaseous formaldehyde is fed under stirring the catalyst.

Suitable solvents used for the slurry polymerization process include aliphatic hydrocarbons such as pentane, hexane, heptane and octane, alicyclic hydrocarbons such as cyclopentane and cyclohexane; aromatic hydrocarbons such as benzene, toluene and xylene. These solvents can be used as the inert medium for dispersing the catalyst. Accordingly, it is preferably to disperse the catalyst in the solvent and to feed the slurry into the reactor.

The polymerization is usually carried out at −40° to 80° C. especially 0° to 60° C. under the pressure of the atmospheric pressure to 10 atm. especially the atmospheric pressure to 4 atm.

The resulting polyoxymethylene is optionally treated by the conventional stabilization in the gas phase polymerization or after separating the inert medium in the slurry polymerization.

Thus, the polyoxymethylene produced by the process of the present invention has excellent thermal stability without the stabilization.

Various stabilizations are known and can be applied. In general, an acetylation of terminal hydroxyl groups of the polyoxymethylene with acetic anhydride is employed. The acetylation is performed by reacting the polyoxymethylene with acetic anhydride in the presence of an acetylation catalyst such as sodium acetate under the atmospheric pressure or slightly higher pressure at about a boiling point of acetic anhydride under the atmospheric pressure (about 139° C.).

Thus, polyoxymethylene produced by the process of the present invention has high thermal stability whereby the complicated stabilization step can be eliminated. When polyoxymethylene having further higher thermal stability is needed, the purpose can be attained by a simple treatment such as a heat treatment for melting the resulting polyoxymethylene for 5 minutes.

In accordance with the process of the present invention, the homopolymer of polyoxymethylene having improved thermal stability can be obtained by the simple operation using the specific catalyst supported on the specific carrier.

The present invention will be further illustrated by certain examples which are included for purposes of illustration only and are not intended to be limiting unless otherwise specified.

The thermal stability of each polyoxymethylene in nitrogen atmosphere was measured by heating the polyoxymethylene at 222° C. for 60 minutes by a thermobalance and measuring percent residual weight, which was shown as $R_{60}$.

The viscosity ($\eta_{sp}/C$) of each polyoxymethylene was measured by dissolving the polyoxymethylene whose terminals were acetylated, at 130° C. for 5 minutes in p-chlorophenol containing 2% of α-pinene and measuring the resulting 0.5 wt.% solution at 60° C. by Ubbelode's viscometer.

Preparation of Catalyst A

In a four necked glass flask, the organoaluminum compound and the amine or the phosphorus compound (Preparation No. 15 and 16) shown in Table 1 and 50 ml of n-hexane were charged.

In Preparation No. 15 and 16; the mixture of them was stirred at 25° C. for 2 hours to prepare the complex compound as the catalytic component.

The modifier shown in Table 1 was further added to the dispersion of the catalytic component and the mixture was stirred and n-hexane was distilled off by heating under the condition shown in Table 1.

In the step, it was not found to distill off the catalytic component and the raw material thereof.

Accordingly, it was considered that all of the organoaluminum compound or the complex component with the amine or the phosphorus compound was supported on the modifier.

The resulting catalyst was heated under the condition shown in Table 1 and then, 50 ml of n-hexane was added to form the slurry.

Preparation of Catalyst B

In a four necked glass flask, the organoaluminum compound shown in Table 1 and 50 ml of xylene were charged.

The modifier shown in Table 1 was further added to the dispersion of the catalytic component and it was dissolved under the condition shown in Table 1 to react them for the specific time and then, xylene was distilled off under the reduced pressure.

In the step, it was not found to distil off the catalytic component and the raw material thereof.

Accordingly, it was considered that all of the organoaluminum compound was supported on the modifier.

The resulting catalyst was admixed with 50 ml of n-hexane to form the slurry.

Table 1
Preparation No. 1–16: Invention
Preparation No. 17–22: Reference

Table 1

| Preparation No. | 1 | 2 | 3 | 4 | 5 |
|---|---|---|---|---|---|
| Catalytic component(g) | | | | | |
| monoethoxyaluminum diethyl | 0.026 | 0.026 | 0.026 | 0.026 | 0.026 |
| monoethoxyaluminum dichloride | — | — | — | — | — |
| triethylaluminum | — | — | — | — | — |
| tri-i-butylaluminum | — | — | — | — | — |
| triethoxyaluminum | — | — | — | — | — |
| ethylaluminum dichloride | — | — | — | — | — |
| $(Et)_2$-Al-O-Al-$(Et)_2$ | — | — | — | — | — |
| complex (a) | — | — | — | — | — |
| complex (b) | — | — | — | — | — |
| Modifier (g) | | | | | |
| methylenebisstearamide | 2.9 | 0.29 | 0.29 | — | — |
| ethylenebisstearamide | — | — | — | 0.30 | — |
| butylenebisstearamide | — | — | — | — | 0.31 |
| ethylenebislauramide | — | — | — | — | — |
| stearamide | — | — | — | — | — |
| lauramide | — | — | — | — | — |
| acetamide | — | — | — | — | — |
| propionamide | — | — | — | — | — |
| capronamide | — | — | — | — | — |
| acetanilide | — | — | — | — | — |
| Preparation method | A | A | B | B | B |
| Condition for mixing | | | | | |
|   Temperature (° C.) | 68 | 68 | 100 | 100 | 100 |
|   Time (hr.) | 0.5 | 0.5 | 1 | 1 | 1 |

Table 1-continued

| Condition for heat treatment | | | | | |
|---|---|---|---|---|---|
| 10 Temperature (° C.) | 100 | 100 | — | — | — |
| Time (hr.) | 1 | 1 | — | — | — |
| Modifier/Al compound (molar ratio) | 25 | 2.5 | 2.5 | 2.5 | 2.5 |

| Preparation No. | 6 | 7 | 8 | 9 | 10 |
|---|---|---|---|---|---|
| Catalytic component(g) | | | | | |
| monoethoxyaluminum diethyl | 0.026 | 0.026 | 0.026 | — | — |
| monoethoxyaluminum dichloride | — | — | — | 0.028 | — |
| triethylaluminum | — | — | — | — | 0.023 |
| tri-i-butylaluminum | — | — | — | — | — |
| triethoxyaluminum | — | — | — | — | — |
| ethylaluminum dichloride | — | — | — | — | — |
| (Et)$_2$-Al-O-Al-(Et)$_2$ | — | — | — | — | — |
| complex (a) | — | — | — | — | — |
| complex (b) | — | — | — | — | — |
| Modifier (g) | | | | | |
| methylenebisstearamide | — | — | — | 2.9 | 0.29 |
| ethylenebisstearamide | — | — | — | — | — |
| butylenebisstearamide | — | — | — | — | — |
| ethylenebislauramide | 2.2 | — | — | — | — |
| stearamide | — | 0.28 | — | — | — |
| lauramide | — | — | 0.20 | — | — |
| acetamide | — | — | — | — | — |
| propionamide | — | — | — | — | — |
| capronamide | — | — | — | — | — |
| acetanilide | — | — | — | — | — |
| Preparation method | A | B | B | A | A |
| Condition for mixing | | | | | |
| Temperature (° C.) | 68 | 65 | 65 | 68 | 68 |
| Time (hr.) | 0.5 | 0.5 | 0.5 | 0.5 | 0.5 |
| Condition for heat treatment | | | | | |
| Temperature (° C.) | 100 | — | — | 120 | 100 |
| Time (hr.) | — | — | — | 1 | 1 |
| Modifier/Al compound (molar ratio) | 25 | 5.0 | 5.0 | 25 | 2.5 |

| Preparation No. | 11 | 12 | 13 | 14 | 15 |
|---|---|---|---|---|---|
| Catalytic component(g) | | | | | |
| monoethoxyaluminum diethyl | — | — | — | — | — |
| monoethoxyaluminum dichloride | — | — | — | — | — |
| triethylaluminum | — | — | — | — | — |
| tri-i-butylaluminum | 0.040 | — | — | — | — |
| triethoxyaluminum | — | 0.032 | — | — | — |
| ethylaluminum dichloride | — | — | — | 0.037 | — |
| (Et)$_2$-Al-O-Al-(Et)$_2$ | — | — | — | 0.037 | — |
| complex (a) | — | — | — | — | 0.026:0.052 |
| complex (b) | — | — | — | — | — |
| Modifier (g) | | | | | |
| methylenebisstearamide | 2.9 | 0.29 | 2.9 | 0.29 | 2.9 |
| ethylenebisstearamide | — | — | — | — | — |
| butylenebisstearamide | — | — | — | — | — |
| ethylenebislauramide | — | — | — | — | — |
| stearamide | — | — | — | — | — |
| lauramide | — | — | — | — | — |
| acetamide | — | — | — | — | — |
| propionamide | — | — | — | — | — |
| capronamide | — | — | — | — | — |
| acetanilide | — | — | — | — | — |
| Preparation method | A | A | A | A | A |
| Condition for mixing | | | | | |
| Temperature (° C.) | 68 | 68 | 68 | 68 | 68 |
| Time (hr.) | 0.5 | 0.5 | 0.5 | 0.5 | 0.5 |
| Condition for heat treatment | | | | | |
| Temperature (° C.) | 100 | 100 | 100 | 100 | 100 |
| Time (hr.) | 1 | 1 | 1 | 1 | 1 |
| Modifier/Al compound (molar ratio) | 25 | 2.5 | 2.5 | 2.5 | 25 |

| Preparation No. | 16 | 17 | 18 | 19 | 20 |
|---|---|---|---|---|---|
| Catalytic component(g) | | | | | |
| monoethoxyaluminum diethyl | — | 0.026 | 0.026 | 0.026 | 0.026 |
| monoethoxyaluminum | — | — | — | — | — |

Table 1-continued

| | | | | | |
|---|---|---|---|---|---|
| dichloride | | | | | |
| triethylaluminum | — | — | — | — | — |
| tri-i-butylaluminum | — | — | — | — | — |
| triethoxyaluminum | — | — | — | — | — |
| ethylaluminum dichloride | — | — | — | — | — |
| $(Et)_2$-Al-O-Al-$(Et)_2$ | — | — | — | — | — |
| complex (a) | — | — | — | — | — |
| complex (b) | 0.026:0.030 | — | — | — | — |
| Modifier (g) | | | | | |
| methylenebisstearamide | 2.9 | — | — | — | — |
| ethylenebisstearamide | — | — | — | — | — |
| butylenebisstearamide | — | — | — | — | — |
| ethylenebislauramide | — | — | — | — | — |
| stearamide | — | — | — | — | — |
| lauramide | — | — | — | — | — |
| acetamide | — | — | 0.059 | — | — |
| propionamide | — | — | — | 0.073 | — |
| capronamide | — | — | — | — | 0.155 |
| acetanilide | — | — | — | — | — |
| Preparation method | A | — | B | B | B |
| Condition for mixing | | | | | |
| Temperature (° C.) | 68 | — | 80 | 65 | 65 |
| Time (hr.) | 0.5 | — | 0.5 | 0.5 | 0.5 |
| Condition for heat treatment | | | | | |
| Temperature (° C.) | 100 | — | — | — | — |
| Time (hr.) | 1 | — | — | — | — |
| Modifier/Al compound (molar ratio) | 25 | — | 5.0 | 5.0 | 5.0 |

| Preparation No. | 21 | 22 |
|---|---|---|
| Catalytic component(g) | | |
| monoethoxyaluminum diethyl | 0.026 | — |
| monoethoxyaluminum dichloride | | 0.028 |
| triethylaluminum | — | — |
| tri-i-butylaluminum | — | — |
| triethoxyaluminum | — | — |
| ethylaluminum dichloride | — | — |
| $(Et)_2$-Al-O-Al-$(Et)_2$ | — | — |
| complex (a) | — | — |
| complex (b) | — | — |
| Modifier(g) | | |
| methylenebisstearamide | — | — |
| ethylenebisstearamide | — | — |
| butylenebisstearamide | — | — |
| ethylenebislauramide | — | — |
| stearamide | — | — |
| lauramide | — | — |
| acetamide | — | — |
| propionamide | — | — |
| capronamide | — | — |
| acetanilide | 0.135 | — |
| Preparation method | B | — |
| Condition for mixing | | |
| Temperature (° C.) | 65 | — |
| Time (hr.) | 0.5 | — |
| Condition for heat treatment | | |
| Temperature (° C.) | — | — |
| Time (hr.) | — | — |
| Modifer/Al compound (molar ratio) | 5.0 | ! |

Note:
Et: ethyl group
complex (a): monoethoxyaluminum diethyl:triphenyl phosphine (0.026 : 0.052)
complex (b): monoethoxyaluminum diethyl : 1,8-diazabicyclo (5,4,0) undecene-7 (0.026 : 0.030)

EXAMPLES

In a 1 liter four necked glass flask, 400 ml of hexane and the resulting catalyst (the amount of the organoaluminum compound is shown in the upper line and the amount of the amine or the phosphorus compound is shown in the lower line of Table 2) was charged. Formaldehyde gas which was substantially anhydrous form obtained by thermally decomposing at 120° to 130° C., paraformaldehyde suspended liquid paraffin, was continuously fed at a rate of 0.6 g/minute with a carrier gas of nitrogen into the mixture to polymerize formaldehyde in the condition shown in Table 2.

As the results, the polyoxymethylenes were obtained as shown in Table 2. The bulk density and $R_{60}$ of the polyoxymethylene are shown in Table 2.

In a 500 ml of necked glass flask, 3 g of dried polyoxymethylene, 200 ml of acetic anhydride and 0.5 g of sodium acetate were charged and the reaction was carried out at 139° C. for 1.5 hours to attain an acetylation of the terminal groups of the polyoxymethylene.

The polyoxymethylene whose terminals were acetylated was washed with acetone and with water and dried under reduced pressure for one night. The viscosity $\eta_{sp}/C$ of the resulting polyoxymethylene is also shown in Table 2.

As the reference, the polymerization was carried out in the same condition except using the catalyst component which was not supported on the carrier. The yield, $R_{60}$ and $\eta_{sp}/C$ of the resulting polyoxymethylene are shown in Table 2.

Table 2
Preparation No. 1–16: Invention
Preparation No. 17–22: Reference

| Test No. | 1 | 2 | 3 | 4 | 5 | 6 |
|---|---|---|---|---|---|---|
| Catalyst: | | | | | | |
| Preparation No. | 1 | 2 | 3 | 4 | 5 | 6 |
| Catalytic component: | | | | | | |
| organoaluminum comp. | 0.0052 | 0.0052 | 0.0052 | 0.0052 | 0.0052 | 0.0052 |
| amine or phosphorus comp. | | | | | | |
| Condition of polymerization: | | | | | | |
| Temperature(° C.) | 30 | 30 | 30 | 30 | 30 | 30 |
| Time (hr.) | 90 | 90 | 90 | 90 | 90 | 90 |
| Results of polymerization: | | | | | | |
| Yield(g) | 40.5 | 36.5 | 43.5 | 39.8 | 38.7 | 39.0 |
| $R_{60}$(wt.%) | 95 | 91 | 90 | 88 | 86 | 83 |
| $\eta sp/C$ | 2.8 | 2.5 | 2.5 | 2.3 | 2.4 | 2.1 |
| Test No. | 7 | 8 | 9 | 10 | 11 | 12 |
| Catalyst: | | | | | | |
| Preparation No. | 7 | 8 | 9 | 10 | 11 | 12 |
| Catalytic component: | | | | | | |
| organoaluminum comp. | 0.0052 | 0.0052 | 0.0057 | 0.0047 | 0.0079 | 0.0065 |
| amine or phosphorus comp. | | | | | | |
| Condition of polymerization: | | | | | | |
| Temperature(° C.) | 30 | 30 | 30 | 30 | 30 | 30 |
| Time (hr.) | 90 | 90 | 90 | 90 | 90 | 90 |
| Results of polymerization: | | | | | | |
| Yield(g) | 40.0 | 37.5 | 35.6 | 39.5 | 40.7 | 31.3 |
| $R_{60}$(wt.%) | 80 | 55 | 90 | 83 | 88 | 80 |
| $\eta sp/C$ | 3.9 | 4.1 | 2.2 | 2.3 | 2.5 | 2.4 |
| Test No. | 13 | 14 | 15 | 16 | 17 | 18 |
| Catalyst: | | | | | | |
| Preparation No. | 13 | 14 | 15 | 16 | 17 | 18 |
| Catalytic component: | | | | | | |
| organoaluminum comp. | 0.0055 | 0.0074 | 0.0052 | 0.0052 | 0.0052 | 0.0052 |
| amine or phosphorus comp. | | | 0.0104 | 0.0060 | | |
| Condition of polymerization: | | | | | | |
| Temperature(° C.) | 30 | 30 | 30 | 30 | 30 | 30 |
| Time (hr.) | 90 | 90 | 90 | 90 | 90 | 90 |
| Results of polymerization: | | | | | | |
| Yield(g) | 30.8 | 32.4 | 31.1 | 33.5 | 35.8 | 38.7 |
| $R_{60}$(wt.%) | 83 | 81 | 80 | 76 | 51 | 9 |
| $\eta sp/C$ | 2.0 | 2.2 | 3.6 | 3.8 | 0.8 | 7.7 |
| Test No. | 19 | 20 | 21 | 22 | | |
| Catalyst: | | | | | | |
| Preparation No. | 19 | 20 | 21 | 22 | | |
| Catalytic component: | | | | | | |
| organoaluminum comp. | 0.0052 | 0.0052 | 0.0052 | 0.0057 | | |
| amine or phosphorus comp. | | | | | | |
| Condition of polymerization: | | | | | | |
| Temperature (° C.) | 30 | 30 | 30 | 30 | | |
| Time (hr.) | 90 | 90 | 90 | 90 | | |
| Results of polymerization: | | | | | | |
| Yield(g) | 30.5 | 36.4 | 21.0 | 30.7 | | |
| $R_{60}$(wt.%) | 7 | 31 | 43 | 10 | | |

Table 2-continued

| Test No. | 1 | 2 | 3 | 4 | 5 | 6 |
|---|---|---|---|---|---|---|
| ηsp/C | 3.6 | 5.0 | 0.8 | 0.9 | | |

What is claimed is:

1. A process for producing polyoxymethylene which comprises polymerizing formaldehyde in the presence of a catalyst comprising
   (a) an organoaluminum catalytic component having the formula (I)

$$R^1-Al\begin{matrix}R^2\\R^3\end{matrix}$$

wherein $R^1$ represents an alkyl or alkoxyl group; $R^2$ represents an alkyl or alkoxyl group or a halogen atom; $R^3$ represents an alkyl or alkoxyl group or a halogen atom or $$-O-Al\begin{matrix}R^4\\R^5\end{matrix}$$

and $R^4$ and $R^5$ each represent an alkyl or alkoxyl group or a halogen atom; and
   (b) a carboxylic acid amide having at least 12 carbon atoms, as a modifier for supporting said catalytic component.

2. The process according to claim 1 wherein said carboxylic acid amide is a compound having the formula $$R^{18}-CONH_2 \qquad (VIII)$$

wherein $R^{18}$ represents a $C_{11}-C_{30}$ alkyl group.

3. The process according to claim 2 wherein said carboxylic acid amide is stearoamide.

4. The process according to claim 1 wherein said carboxylic acid amide is a compound having the formula $$R^{19}-CONH-R^{20}-NHCO-R^{21} \qquad (IX)$$

wherein $R^{19}$ and $R^{21}$ each represent a $C_{11}-C_{30}$ alkyl group and; $R^{20}$ represents a $C_1-C_{10}$ alkylene group or a $C_6-C_{20}$ aromatic divalent group or a $C_3-C_{20}$ alicyclic divalent group.

5. The process according to claim 4 wherein $R^{19}$ and $R^{21}$ said represent a $C_{11}-C_{17}$ alkyl group and $R^{20}$ represents a $C_1-C_4$ alkylene group in the formula (IX).

6. The process according to claim 1 wherein $R^1$ and $R^2$ each represent an alkyl or alkoxyl group; $R^3$ represents an alkyl or alkoxyl group or $$-O-Al\begin{matrix}R^4\\R^5\end{matrix}$$

and $R^4$ and $R^5$ each, represent an alkyl or alkoxyl group.

7. The process according to claim 1 wherein said organoaluminum catalytic component is a complex of the compound having the formula (I) and an amine.

8. The process according to claim 1 wherein said organoaluminum catalytic component is a complex of the compound having the formula (I) and a phosphorus compound.

9. The process according to claim 7 wherein the amine used for the formation of said complex is 1,8-diazabicyclo(5,4,0) undecene-7, bipyridyl, pyridine, ethylenediamine, propylenediamine, tri-n-butyldiamine, or stearyl amine.

10. The process according to claim 8, wherein the phosphorus compound used for the formation of said complex is a compound having the formula $$R_3^{14}P \qquad (VI)$$

or $$R_3^{15}P=O \qquad (VII)$$

wherein $R^{14}$ is an alkyl, aryl, alkoxyl or aryloxyl group and $R^{15}$ is an alkyl, aryl, alkoxyl or aryloxyl group or $R^{16}R^{17}N$-group and $R^{16}$ and $R^{17}$ each represent an alkyl group.

11. The process according to claim 1, wherein the ratio of said organoaluminum catalytic component to said carboxylic acid amide modifier is in the range of from $10^{-1}$ to $10^{-6}$ mole/g.

12. The process according to claim 1, wherein the polymerization is carried out by feeding formaldehyde into a reactor to contact formaldehyde with said organoaluminum catalytic component supported on said carboxylic acid amide modifier, said polymerization being conducted either in an inert solvent or in the gas phase.

* * * * *